(12) United States Patent
Chun

(10) Patent No.: US 7,754,376 B2
(45) Date of Patent: Jul. 13, 2010

(54) CYLINDRICAL LITHIUM SECONDARY BATTERY AND METHOD OF FABRICATING THE SAME

(75) Inventor: Kwansic Chun, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 1003 days.

(21) Appl. No.: 11/478,444

(22) Filed: Jun. 28, 2006

(65) Prior Publication Data

US 2007/0020517 A1     Jan. 25, 2007

(30) Foreign Application Priority Data

Jun. 28, 2005    (KR) .................... 10-2005-0056422

(51) Int. Cl.
     *H01M 2/18*      (2006.01)
(52) U.S. Cl. ................... 429/130; 429/129; 429/247
(58) Field of Classification Search .............. None
See application file for complete search history.

(56) References Cited

U.S. PATENT DOCUMENTS

| 3,510,353 | A * | 5/1970 | McHenry ............... 429/94 |
| 6,451,473 | B1 * | 9/2002 | Saito et al. ............. 429/94 |
| 2003/0215717 | A1 * | 11/2003 | Miyaki ................. 429/232 |
| 2004/0015198 | A1 | 1/2004 | Skarstad et al. |
| 2004/0151980 | A1 | 8/2004 | Miyaki |

FOREIGN PATENT DOCUMENTS

JP      11-067186    *   9/1999

OTHER PUBLICATIONS

Machine translation of JP 11-067186.*
Chinese Office action, with English translation, dated Feb. 15, 2008, for corresponding Chinese Patent Application No. 200610099675.1, indicating the relevance of the cited reference, as well as US 6,451,473 B1 (which was cited in an IDS dated May 7, 2008). The No. of US 2004/0015198 A1, cited in the IDS dated May 7, 2008 and in the Chinese Office action, was a typographical error and should be 2004/0151980 as cited above.

* cited by examiner

*Primary Examiner*—Patrick Ryan
*Assistant Examiner*—Cynthia Lee
(74) *Attorney, Agent, or Firm*—Christie, Parker & Hale, LLP

(57) ABSTRACT

A cylindrical lithium secondary battery including a winding-type electrode assembly having a first electrode plate to which a first electrode tap is attached, a second electrode plate to which a second electrode tap is attached, and a separator interposed between the first electrode plate and the second electrode plate. A space is formed through a central longitudinal axis of the electrode assembly. The battery includes a cylindrical case adapted to receive and house the electrode assembly, the cylindrical case having a bottom surface. A first insulation plate insulating the electrode assembly from the cylindrical case is located adjacent the bottom surface and includes a recess adapted to accommodate the first electrode tap, the first electrode tap being coupled to the bottom surface. The battery also includes a cap assembly located at an opposite end of the cylindrical case from the bottom surface, the cap assembly being coupled to the second electrode tap and sealing the case.

14 Claims, 9 Drawing Sheets

CYLINDRICAL LITHIUM SECONDARY BATTERY AND METHOD OF FABRICATING THE SAME

CROSS-REFERENCE TO RELATED PATENT APPLICATION

This application claims priority to and the benefit of Korean Patent Application No. 10-2005-0056422, filed on Jun. 28, 2005, in the Korean Intellectual Property Office, the entire content of which is incorporated herein by reference.

BACKGROUND OF THE INVENTION

1. Field of the Invention

The present invention relates to a cylindrical lithium ion secondary battery, and more particularly, to a cylindrical lithium secondary battery having improved structural stability.

2. Description of Related Art

Recently, a large number of compact and lightweight electronic apparatus such as cellular phones, notebook computers, and camcorders have been developed and manufactured. These portable electronic apparatus are provided with battery packs so that the apparatus can operate without separate power supplies. Each battery pack includes at least one battery to drive the portable electronic apparatuses for a predetermined time.

Recently, battery packs have employed secondary (rechargeable) rechargeable batteries. Representative secondary batteries include nickel cadmium (Ni—Cd) batteries, nickel hydride (Ni-MH) batteries, and lithium rechargeable batteries such as lithium (Li) polymer batteries and Lithium ion (Li-ion) batteries.

Lithium secondary batteries have an operating voltage of 3.6V which is three times higher than a Ni—Cd battery or a Ni-MH battery. In addition, lithium secondary batteries have a high energy density per unit weight. Therefore, demand for lithium secondary batteries has rapidly increased.

For lithium secondary batteries, a lithium-based oxide is used as a positive electrode active material and carbon is used as a negative electrode active material. In general, batteries are classified as either liquid electrolyte batteries or polymer electrolyte batteries according to the type of the electrolyte used. Lithium secondary batteries using liquid electrolyte are called lithium ion batteries, and lithium secondary batteries using polymer electrolyte are called lithium polymer batteries. Lithium secondary batteries are manufactured in various shapes and are classified, for example, into cylindrical batteries, prismatic batteries, and pouch-type batteries.

In general, a lithium secondary battery includes an electrode assembly, a case adapted to receive the electrode assembly, and electrolyte solution injected inside the case to enable the lithium ions to move. The electrode assembly includes a positive electrode plate coated with a positive electrode active material, a negative electrode plate coated with a negative electrode active material, and a separator interposed between the positive and negative electrode plates to prevent a short circuit between the two electrode plates and to allow only lithium ions to pass through.

The electrode assembly of a cylindrical lithium secondary battery is constructed by overlaying and rolling the positive electrode plate connected to a positive tab, the negative electrode plate connected to a negative tab, and the separator.

The electrode assembly is then inserted into the case and fixed therein. The electrolyte solution is injected into the case and the opening of the case is sealed with a cap assembly.

Typically, insulation plates are combined with the electrode assembly, and the negative tab of the electrode assembly is attached to the cylindrical case.

The number of cylindrical lithium secondary batteries having high capacity is rapidly increasing. Accordingly, the positive and negative tabs of the electrode assembly have become thicker.

However, in a cylindrical lithium secondary battery, if the negative tab is thick, an insulation plate attached to the negative tab may become deformed so as to create a spatial non-uniformity in the battery. The non-uniformity may adversely affect the safety of the cylindrical lithium secondary battery when an external pressure is applied to the battery.

SUMMARY OF THE INVENTION

The present invention provides a cylindrical lithium secondary battery having an improved structural stability. More specifically, the cylindrical lithium secondary battery includes an insulation plate having a recession for receiving an electrode tab.

According to an aspect of the present invention, a cylindrical lithium secondary battery is provided including a winding-type electrode assembly comprising a first electrode plate to which a first electrode tab is attached, a second electrode plate to which a second electrode tab is attached, and a separator interposed between the first and second electrode plates, wherein a predetermined space is formed in a center of the electrode assembly; a cylindrical case comprising a cylindrical side surface having a predetermined space to receive the electrode assembly and a bottom surface of a lower portion of the cylindrical side surface; an insulation plate insulating the electrode assembly from the cylindrical case in the lower part of the electrode assembly and comprising a recession to receive one of the first and second electrode tabs; and a cap assembly combining into a top part of the case and sealing the top part of the case.

In addition, the insulation plate may be a circular-shaped flat plate and comprise a passing hole in a center portion.

In addition, a width of the recession may be equal to or larger than a diameter of the passing hole of the insulation plate.

In addition, a length of the recession is equal to or larger than a sum of radiuses of the insulation plate and the passing hole.

In addition, the cylindrical lithium secondary battery may further comprise a center pin inserted into a center space of the electrode assembly.

In addition, the cylindrical lithium secondary battery may further comprise an insulation plate of a top portion insulating the electrode assembly from the cap assembly in the top portion of the electrode assembly.

In addition, the cylindrical lithium secondary battery may further comprise electrolyte solution, which is inserted into the cylindrical case, enabling lithium ions to move.

According to another aspect of the present invention, there is provided a fabrication method of a cylindrical lithium secondary battery, comprising steps of: forming an electrode assembly having a predetermined space in a center by winding a first electrode plate to which a first electrode tab is attached, a second electrode plate to which a second electrode tab is attached, and a separator interposed between the first and second electrode plates; inserting the electrode assembly into a cylindrical case so that one of the first and second electrode tabs are received into a recession of an insulation plate comprising the recession in a bottom surface, and the insulation plate is disposed in a bottom portion; and combining a cap assembly into a top portion of the cylindrical case.

In addition, the fabrication method may further comprise a step of inserting an insulation of an upper portion insulating the electrode assembly from the cap assembly in the top portion of the electrode assembly.

In addition, the fabrication method may further comprise a step of inserting a center pin into a center space of the electrode assembly.

In addition, the fabrication method may further comprise a step of injecting electrolyte solution into the cylindrical case.

DETAILED DESCRIPTION OF THE INVENTION

Figure 1A:
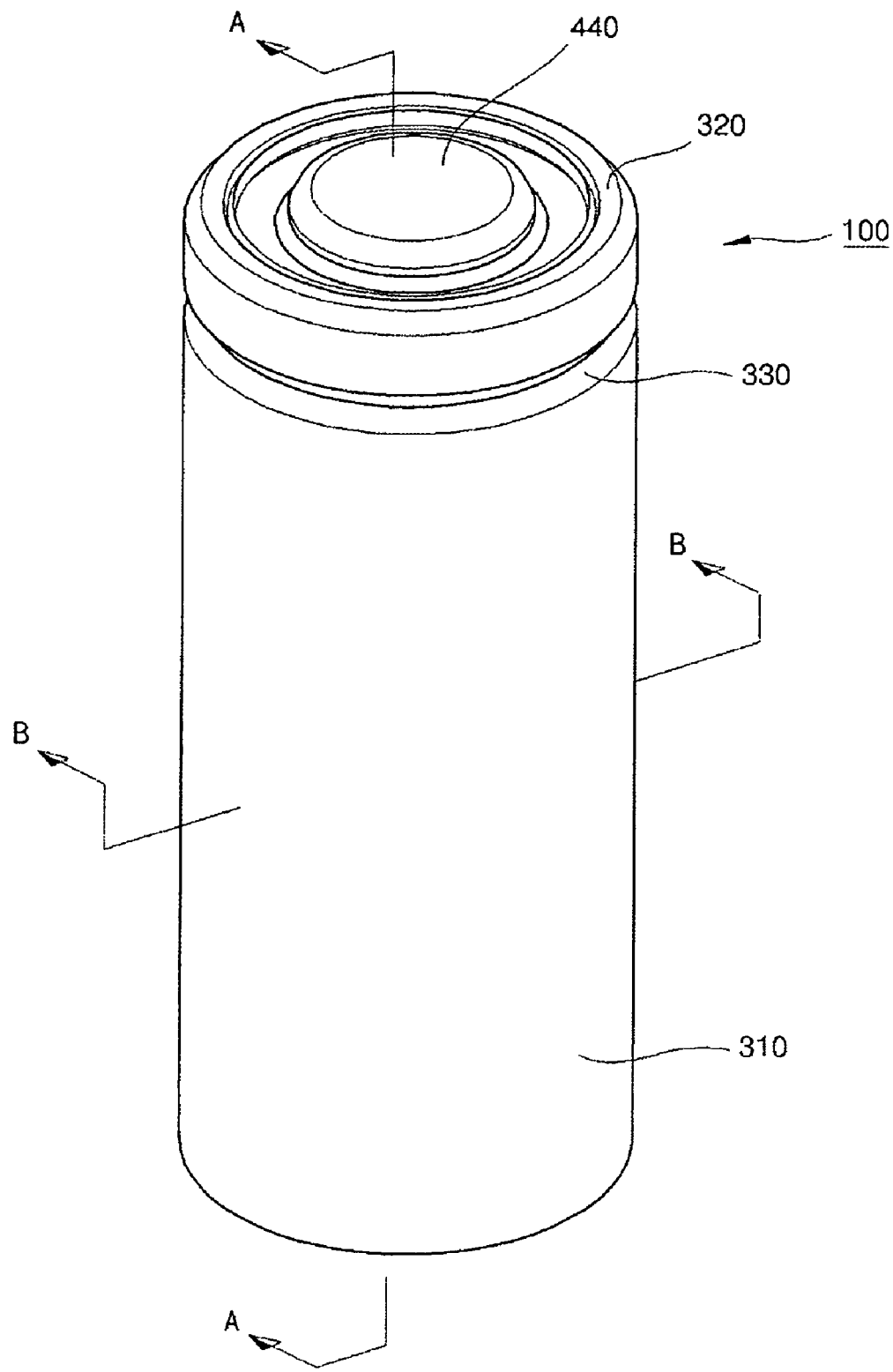
FIG. 1A is a perspective view of a cylindrical lithium secondary battery according to an embodiment of the present invention.
Figure 1B:
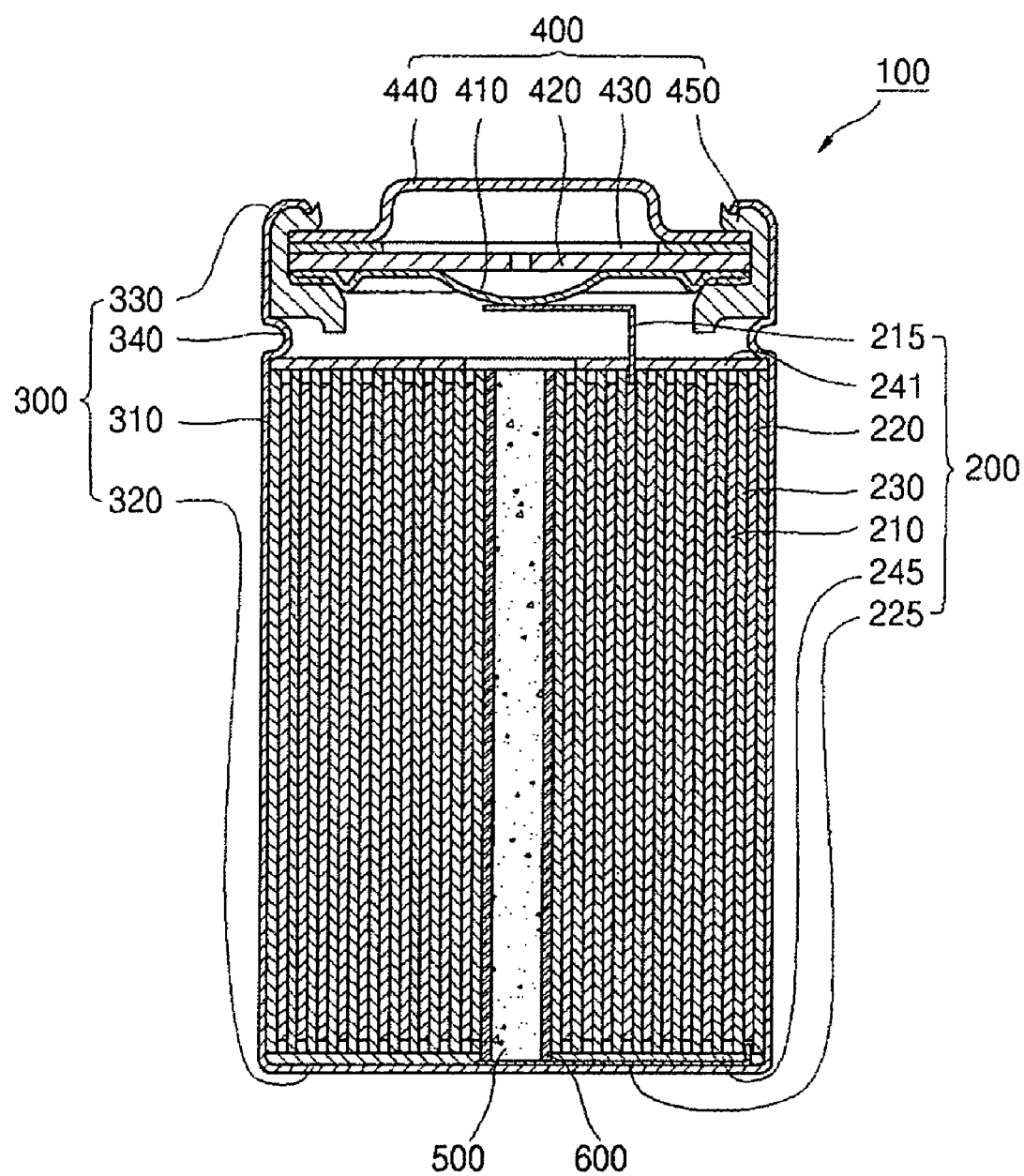
FIG. 1B is a sectional view of the cylindrical lithium secondary battery 100 taken along section line A-A of FIG. 1.
Figure 1C:
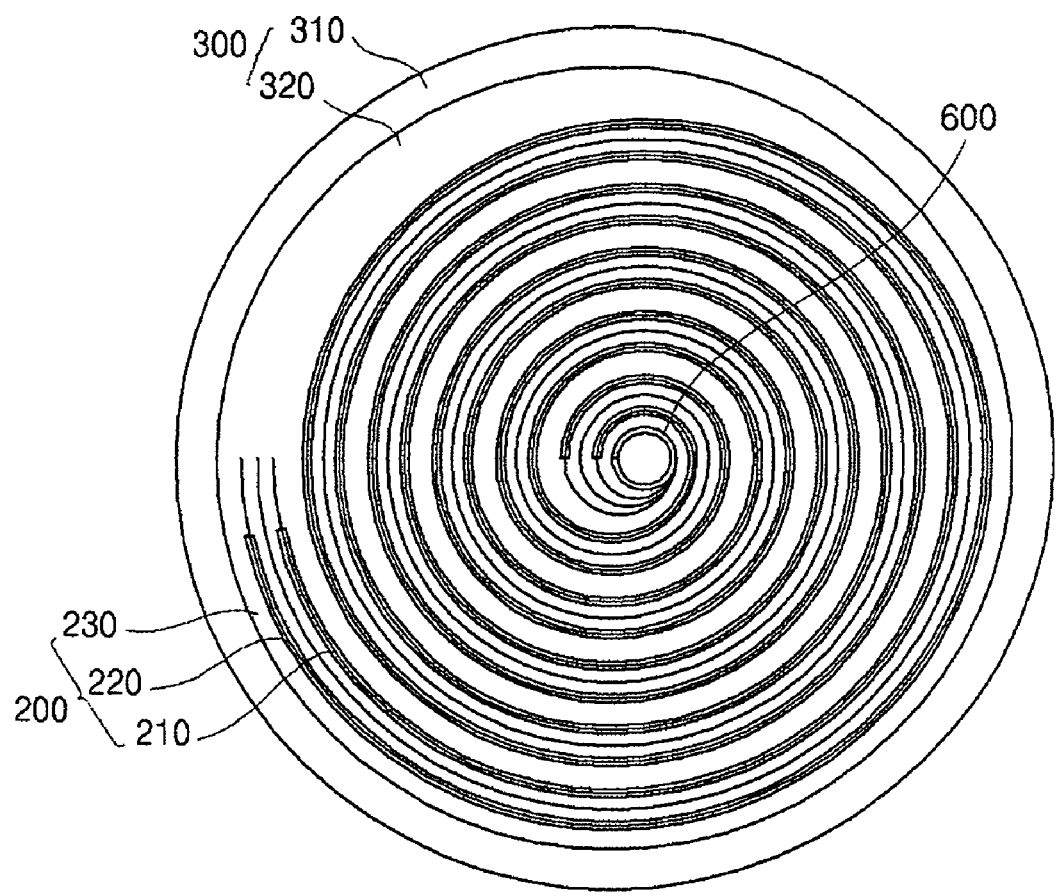
FIG. 1C is a sectional view of the cylindrical lithium secondary battery 100 taken along section line B-B of FIG. 1.

As illustrated in FIGS. 1A to 1C, a cylindrical lithium secondary battery 100 according to an embodiment of the present invention has a structure including an electrode assembly 200 generating a voltage difference between charging and discharging, a cylindrical case 300 accommodating the electrode assembly 200, a cap assembly 400 assembled onto the cylindrical case 300 to contain the electrode assembly 200, electrolyte solution injected inside the cylindrical case 300 to enable the lithium ions to move, and a center pin 600 disposed in the electrode assembly 200.

The electrode assembly 200 includes a first electrode plate 210 coated with, for example, a positive electrode material, and a second electrode plate 220 coated with, for example, a negative active material, and a separator 230 interposed between the first and second electrode plates 210, 220 to prevent a short circuit between the two electrode plates 210, 220 and to allow only lithium ions (Li-ions) to pass through. The first and second electrode plates 210, 220 and the separator 230 are wound in a substantially circular form and are inserted into the cylindrical case 300. In addition, a first electrode tab 215, typically made from aluminum and protruding from the electrode assembly may function as a positive electrode tab and may be attached to the first electrode plate 210. In addition, a second electrode tab 225, typically made from nickel and protruding from the electrode assembly may function as a negative electrode tab and may be attached to the second electrode plate 220. However, materials of the electrode tabs are not limited thereto. In addition, upper and lower insulation plates 241, 245 are attached to the electrode assembly to prevent direct contact between the electrode assembly and the cap assembly 400 and electrode assembly and the cylindrical case 300.

Figure 2A:
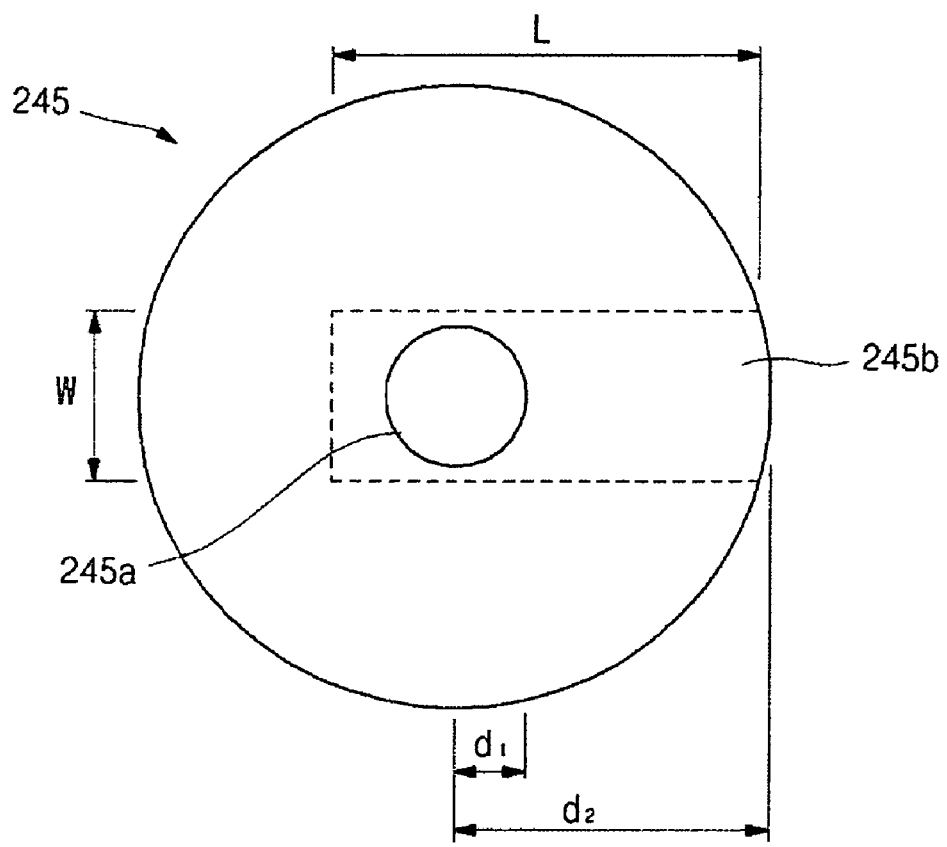
FIG. 2A is a top view of the cylindrical lithium secondary battery according to an embodiment of the present invention.
Figure 2B:
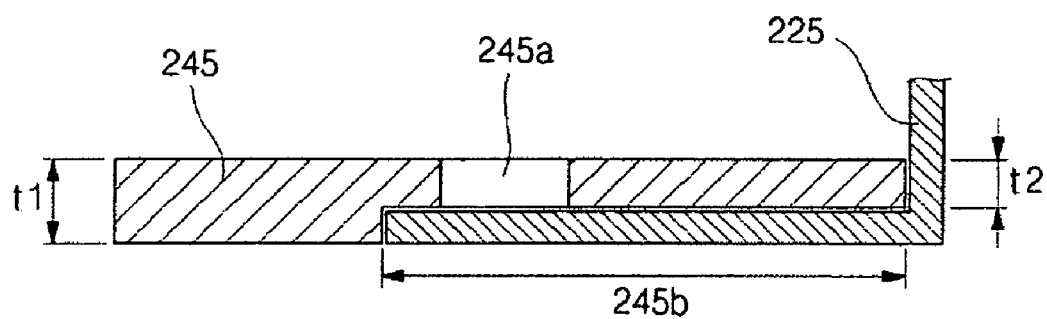
FIG. 2B is a diagram of a lower insulation plate and an electrode tab of a cylindrical lithium secondary battery according to an embodiment of the present invention.

As shown in FIG. 2B, a recess for receiving the second electrode tab 225 functioning as the negative tab is formed in an exterior facing surface of the lower insulation plate 245.

The cylindrical case 300 includes a space into which the electrode assembly 200 is receivable. The cylindrical case 300 includes a cylindrical surface 310 and a bottom surface 320. An end of the cylindrical case 300 is open to allow insertion of the electrode assembly 200. The second electrode tab 225 may be attached to the bottom surface 320 of the cylindrical case 300 to allow the case to functions as a negative electrode terminal. The cylindrical case 300 may be made of, for example, aluminum, iron, or an alloy of aluminum and iron. The cylindrical case 300 includes a crimping region 330 and a beading region 340 to more securely fix the cap assembly to the cylindrical case 300.

The cap assembly 400 includes a conductive safety bent 410, a printed circuit board (PCB) 420, a positive thermistor 430, a conductive electrode cap 440, and an insulation gasket 450. The conductive safety bent 410 to which the first electrode tab 215 is welded is inverted when the battery is overcharged or when the battery generates an excessive amount of heat. The PCB 420 is electrically and mechanically connected to the conductive safety bent 410. The connection between the PCB 420 and the conductive safety bent 410 is severed when the conductive safety bent 410 is inverted. The positive thermistor 430 is connected to the PCB and cuts off at a temperature above a predetermined temperature. The conductive electrode cap 440 is electrically and mechanically connected to the positive thermistor 430 and provides a current to an external circuit. The insulation gasket 450 has a form wrapping around the conductive safety bent 410, the PCB 420, the positive thermistor 430, and the electrode cap 440 and insulates these components from the cylindrical case 300. In one exemplary embodiment, the electrode cap 440 is attached to the first electrode tab 215 and functions as a positive electrode terminal.

Electrolyte solution 500 is injected into the cylindrical case 300 to enable the lithium ions to move between the electrode assembly 200 and the case 300. The electrolyte solution 500 functions as a carrier of the lithium ions generated by an electro-chemical reaction during charging or discharging in positive and negative electrodes inside the battery. The electrolyte solution 500 may be an organic electrolyte solution which is a mixture of a lithium salt and a high-purity organic solvent. Alternatively, the electrolyte solution may be a polymer using polymer electrolyte. However, the type of the electrolyte solution 500 is not limited thereto.

The winding core member 600 is inserted into a central space of the winding electrode assembly 200 and prevents the winding electrode assembly 200 from relaxing and uncoiling. In addition, the winding core member 600 serves to prevent the winding electrode assembly 200 from being deformed by an external force. The winding core member 600 is formed in a substantially tubular form.

In addition, the winding core member 600 is formed to have a height of between about 90% to 110% of a height of the electrode assembly 200, and a lower end of the winding core member 600 is disposed on the second electrode tab 225. If the height of the winding core member 600 is less than 90% of the height of the electrode assembly 200, the electrode assembly 200 may not be able to be securely attached to the winding core member. If the height of the winding core member 600 is greater than 110% the height of the electrode assembly 200, the winding core member 600 may contact and interfere with the cap assembly 400.

Referring to FIGS. 2A and 2B, the lower insulation plate 245 of the cylindrical lithium secondary battery 100 is formed in a substantially circular flat plate shape.

The lower insulation plate 245 includes a centrally located substantially circular-shaped through-hole 245a and a recess 245b formed in an exterior facing surface of the lower insulation plate. The recess 245b is adapted to receive the second electrode tab 225 functioning as a negative electrode tab. The hole 245a functions as a pathway allowing the winding core member 600 to be connected to the second electrode tab 225.

A width W of the recess 245b may be equal to or larger than a diameter $2d_1$ of the hole, and a length L of the recess 245b may be equal to or larger than a sum of a radius $d_2$ of the lower insulation plate 245 and a radius $d_1$ of the hole.

In addition, as illustrated in FIG. 2B, the second electrode tab 225 is received in the recess 245b and is attached to a bottom surface of the cylindrical case 300

According to the above-described structure, the likelihood of deformity of the lower insulation plate 245 is reduced, stabilizing and improving a structure of the cylindrical lithium secondary battery.

Figure 3:
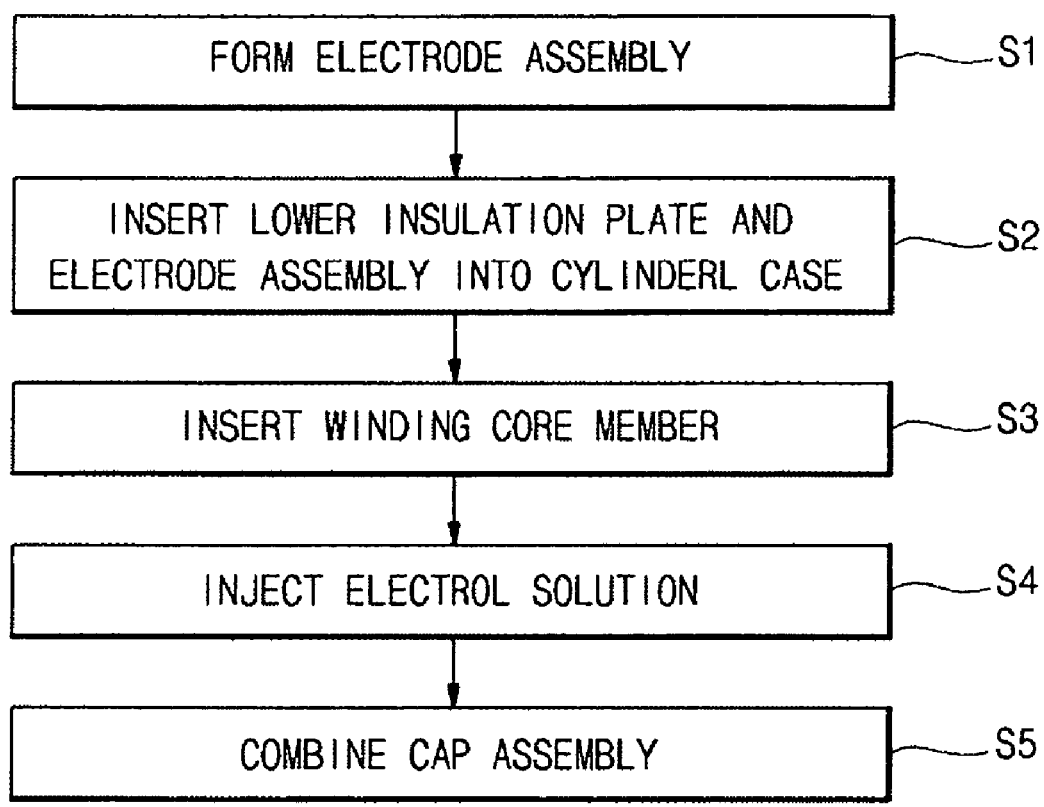
FIG. 3 is a flowchart of a fabrication method of the cylindrical lithium second battery according to another embodiment of the present invention.

Referring to FIG. 3, a fabrication method of the cylindrical lithium second battery according to an embodiment of the present invention includes forming (S1) an electrode assembly 200, inserting (S2) a lower insulation plate and an electrode assembly into a case, inserting (S3) a center pin axially through the center of the electrode assembly, injecting (S4) electrolyte solution into the case, and combining (S5) a cap assembly with the case to complete the cylindrical lithium secondary battery.

Figure 4A:
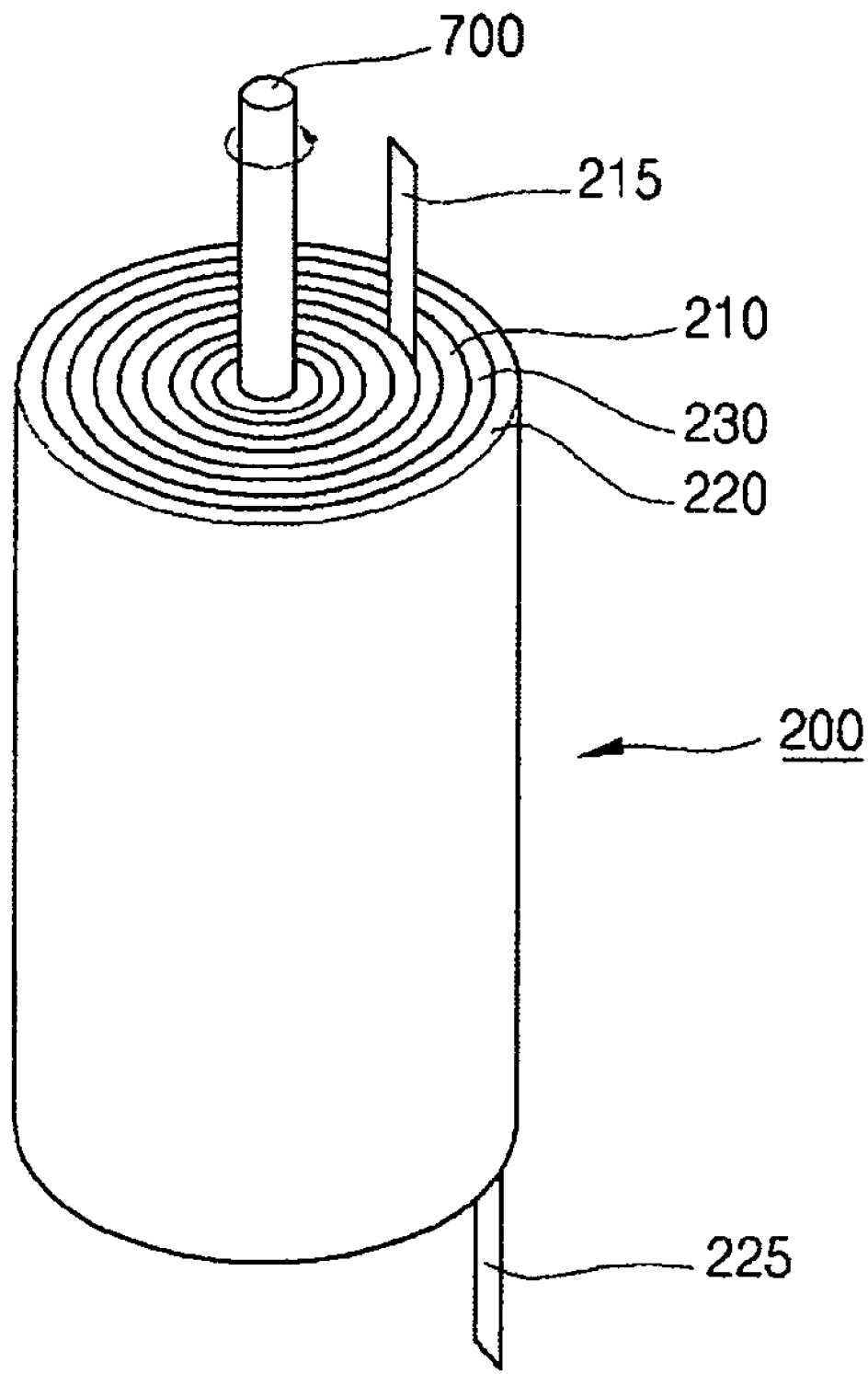
FIGS. 4A to 4D are diagrams illustrating a fabrication method of the cylindrical lithium second battery according to an embodiment of the present invention.

Referring now to FIG. 3 and FIGS. 4A-4D, a method for assembling a cylindrical lithium secondary battery according to an embodiment of the present invention will be described. With reference to FIG. 4A, a first electrode plate 210, a separator 230, and a second electrode plate 220 are layered. A winding axis 700 is attached to one end of the layered structure, and the layered structure is wound into a substantially cylindrical shape to form the electrode assembly. Before the electrode plates 210, 230 and the separator 220 are wound, first and second electrode tabs 215, 225 may be attached to first and second electrode plates 210, 220, respectively.

Figure 4B:
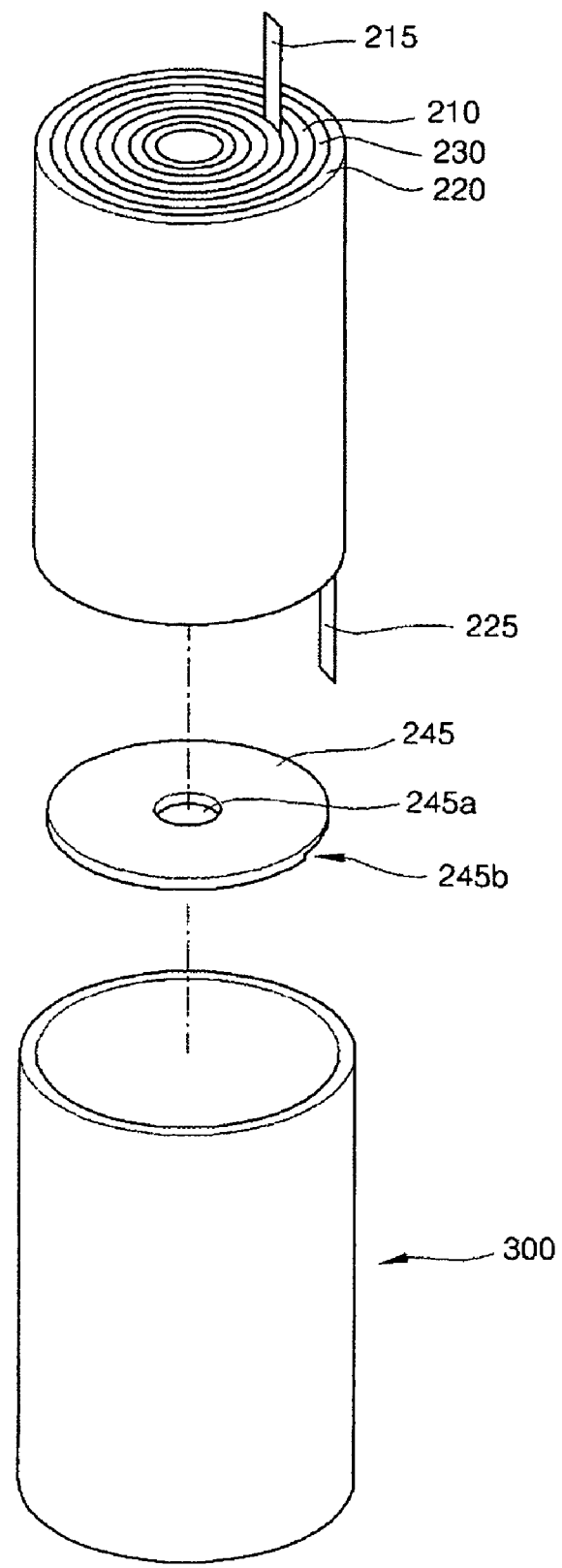

Referring to FIG. 4B, the second electrode tab 225 is folded into the recess 245b of the lower insulation plate 245 and the lower insulation plate 245 and the electrode assembly 200 are inserted to the cylindrical case 300. The second electrode tab 225 may be attached to the recess 245b by, for example, welding.

The winding axis 700 may be removed from the electrode assembly 200 before the electrode assembly 200 is inserted into the case 300.

Figure 4C:
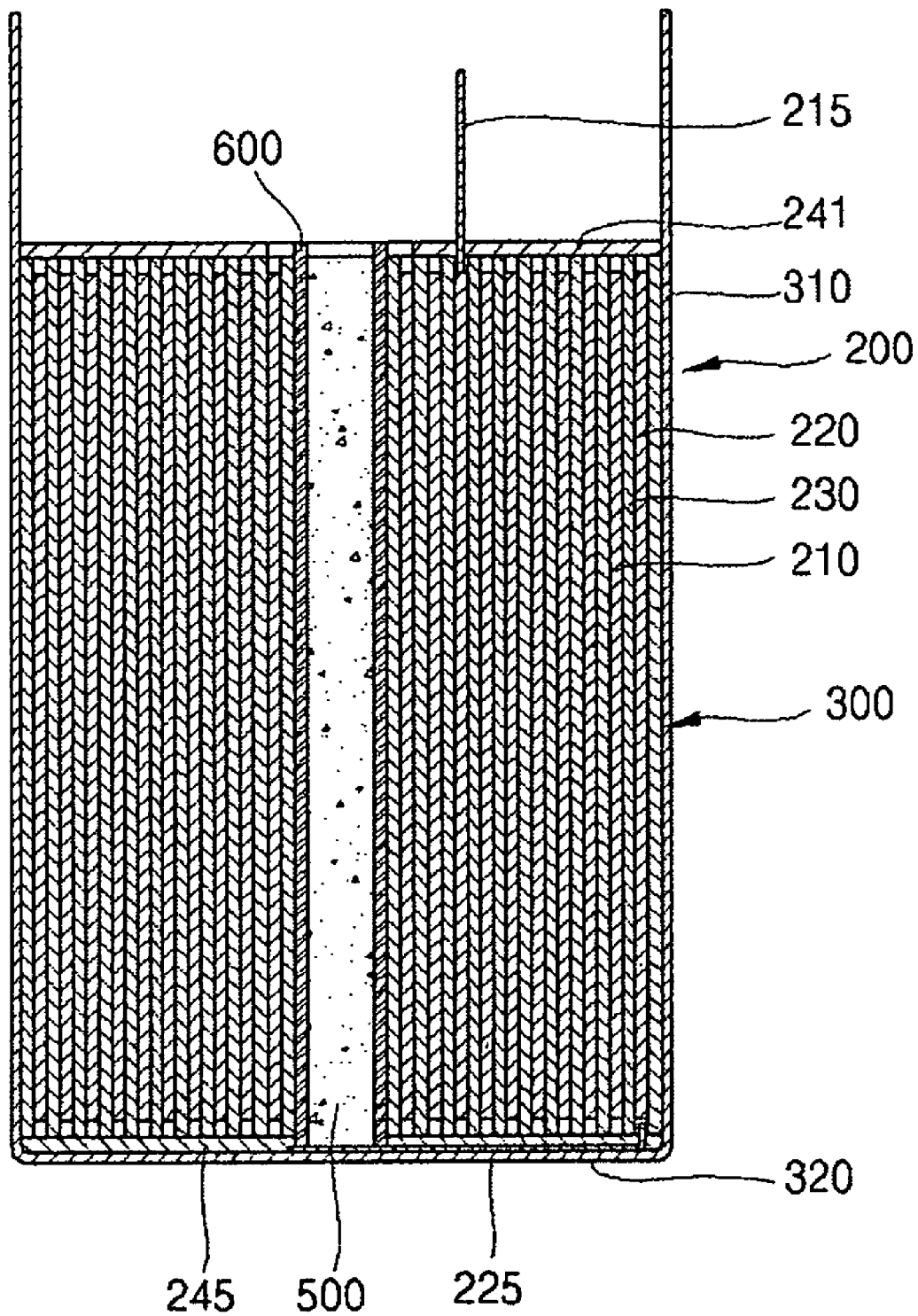

Referring to FIG. 4C, a center pin 600 is inserted into a space vacated by removal of the winding axis 700. Additionally, the second electrode tab 225 may be fixed to the bottom surface 320 of the cylindrical case 300 by, for example, welding, before the winding core member 600 is inserted. Accordingly, the winding core member 600 is disposed to contact the second electrode tab 225 and allows the second electrode tab 225 to be more securely in contact with the cylindrical case.

With continued reference to FIG. 4C, electrolyte solution 500 is injected to the case 300 after the electrode assembly 200 has been inserted into the case. The electrolyte solution 500 enables the lithium ions to move between the first and second electrode plates 210, 220 during charging or discharging of the battery.

Figure 4D:
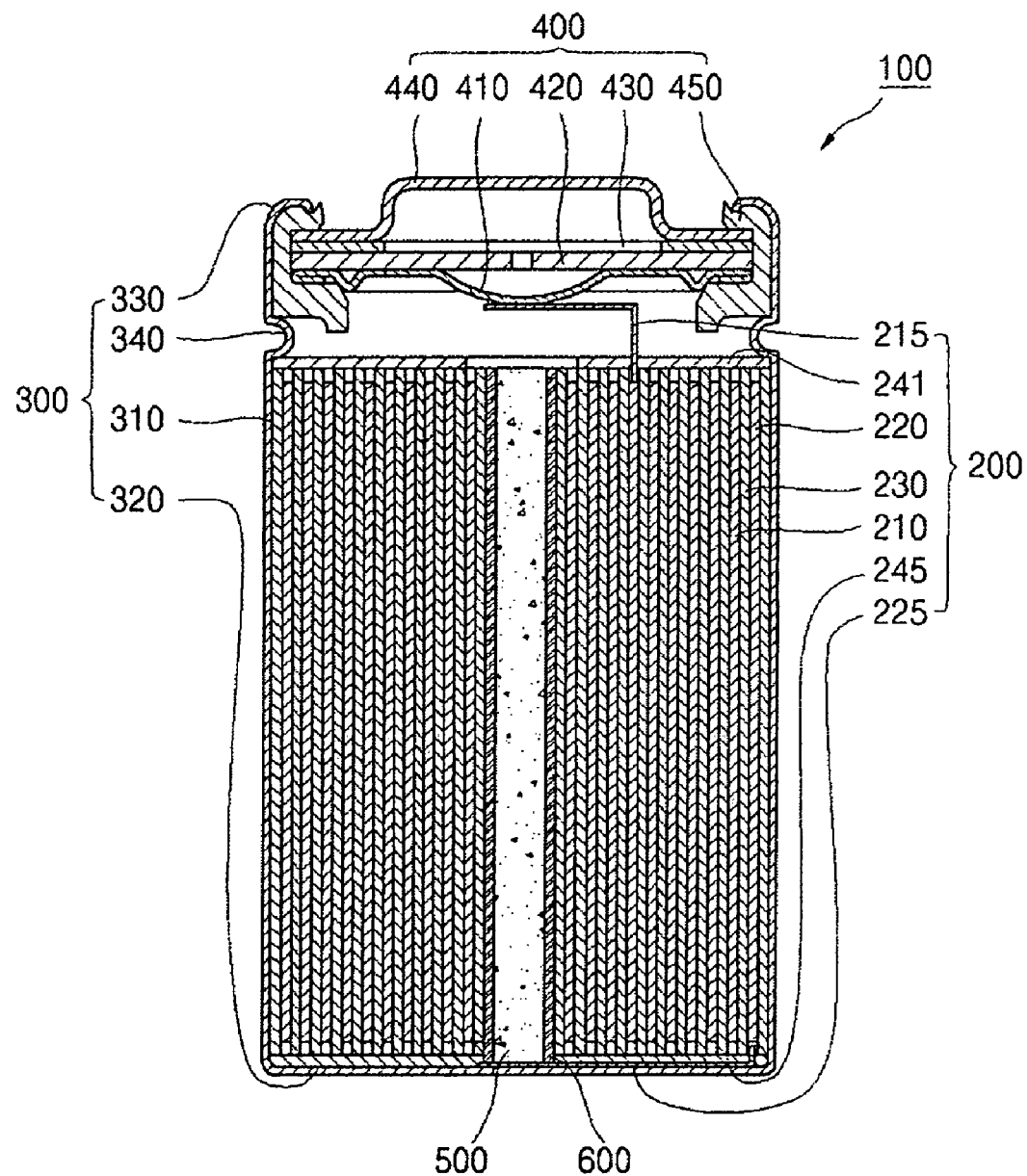
Figure 3:
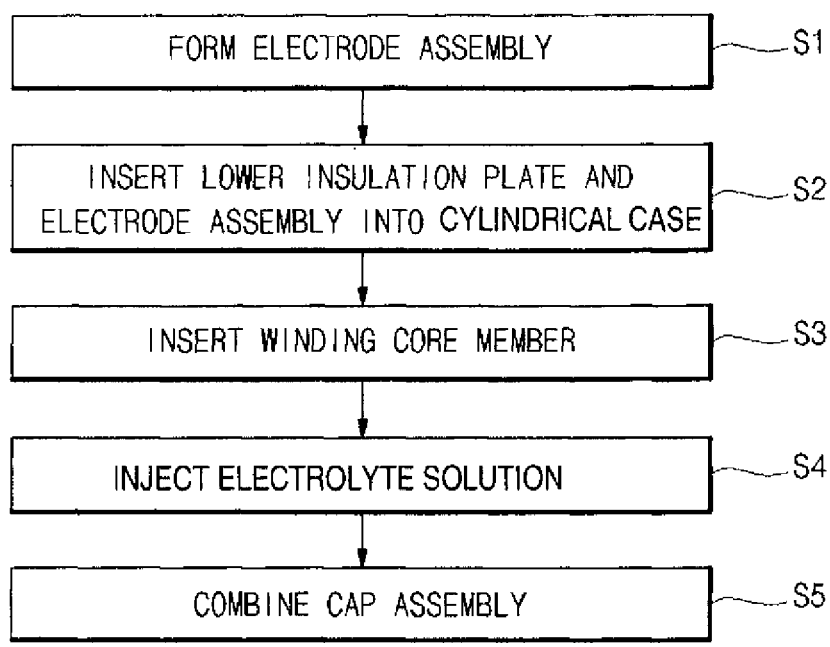

Referring to FIG. 4D, the cap assembly 400 is combined with the cylindrical case 300 to complete fabrication of the cylindrical lithium secondary battery 100, securing the electrode assembly 200, the winding core member 600, the winding core member 600, and the electrolyte solution 500 in the case 300.

More specifically, a substantially ring-shaped insulation gasket 450 is inserted into a top portion of the cylindrical case 300, and the first electrode tab 215, a conductive safety bent 410, a printing circuit board 420, and a positive thermistor 430, and an electrode cap 440 are sequentially located within the gasket.

Thereafter, a portion of the cylindrical case 300 is beaded to form a beading region 340 and a portion of the case 300 is crimped to form a crimping region 300, reducing the likelihood that the cap assembly 400 will be detached from the case 300.

As described above, in the cylindrical lithium secondary battery according to embodiments of the present invention, the likelihood of deformity of a lower insulation plate resulting from a thick electrode tab may be reduced. More specifically, a lower insulation plate having a recess adapted to receive an electrode tab is provided. Accordingly, a stability of the cylindrical lithium secondary battery is improved.

While the present invention has been particularly shown and described with reference to exemplary embodiments thereof, it will be understood by those skilled in the art that various changes in form and details may be made therein without departing from the spirit and scope of the invention as defined by the appended claims.

What is claimed is:

1. A cylindrical lithium secondary battery comprising:
a winding-type electrode assembly including a first electrode plate to which a first electrode tab is attached, a second electrode plate to which a second electrode tab is attached, and a separator interposed between the first electrode plate and the second electrode plate, wherein a space is formed through a central longitudinal axis of the electrode assembly;
a cylindrical case adapted to receive and house the electrode assembly, the cylindrical case having a bottom surface;
a first insulation plate insulating the electrode assembly from the cylindrical case, the first insulation plate being located adjacent the bottom surface and including a recess adapted to accommodate the first electrode tab so that the first electrode tab is coupled to the cylindrical case;
a cap assembly located at an opposite end of the cylindrical case from the bottom surface, the cap assembly being coupled to the second electrode tab and sealing the case; and
wherein the bottom surface of the case and a surface of the recess facing the bottom surface maintain substantially a same distance throughout a longitudinal direction of the recess.

2. The cylindrical lithium secondary battery according to claim 1, wherein the insulation plate is substantially circular and has a centrally located insulation plate through-hole.

3. The cylindrical lithium secondary battery according to claim 2, wherein a width of the recess is about equal to or larger than a diameter of the insulation plate through-hole.

4. The cylindrical lithium secondary battery according to claim 2, wherein a length of the recess is about equal to or larger than a sum of radii of the insulation plate and the insulation plate through-hole.

5. The cylindrical lithium secondary battery according to claim 1, further including a center pin inserted into the space of the electrode assembly.

6. The cylindrical lithium secondary battery according to claim 1, further including a second insulation insulating the electrode assembly from the cap assembly, the second insulation plate located between the electrode assembly and the cap assembly.

7. The cylindrical lithium secondary battery according to claim 1, further including electrolyte solution in the cylindrical case, the electrolyte solution enabling lithium ions to move.

8. A method of fabricating a cylindrical lithium secondary battery comprising:
    forming a cylindrical electrode assembly having a space along a central longitudinal axis by winding a first electrode plate to which a first electrode tab is attached such that the first electrode tab extends from a first end of the cylindrical electrode assembly, a second electrode plate to which a second electrode tab is attached such that the second electrode tab extends from a second end of the cylindrical electrode assembly, and a separator interposed between the first electrode plate and the second electrode plate;
    locating a first insulation plate adjacent to and substantially parallel to the first end of the cylindrical electrode assembly;
    inserting the first electrode tab into a recess in a surface of the first insulation plate such that the first insulation plate is between the first electrode tab and the electrode assembly;
    inserting the electrode assembly into an open end of a cylindrical case, the cylindrical case having a bottom surface opposite the open end, so that the first electrode tab is located between the first insulation plate and the bottom surface of the cylindrical case and contacts the bottom surface,
    combining a cap assembly with the cylindrical case such that the cap assembly is coupled to the second electrode tab and seals the open end of the cylindrical case; and
    wherein the bottom surface of the case and a surface of the recess facing the bottom surface maintain substantially a same distance throughout a longitudinal direction of the recess.

9. The fabrication method according to claim 8, further comprising inserting a second insulation plate between the cap assembly and the electrode assembly to insulate the electrode assembly from the cap assembly.

10. The fabrication method according to claim 8, further comprising inserting a center pin into the space of the electrode assembly.

11. The fabrication method according to claim 8, further comprising injecting electrolyte solution into the cylindrical case.

12. A cylindrical lithium secondary battery comprising:
    a winding-type electrode assembly including a first electrode plate to which a first electrode tab is attached, a second electrode plate to which a second electrode tab is attached, and a separator interposed between the first electrode plate and the second electrode plate, wherein a space is formed through a central longitudinal axis of the electrode assembly;
    a cylindrical case adapted to receive and house the electrode assembly, the cylindrical case having a bottom surface;
    a first insulation plate insulating the electrode assembly from the cylindrical case, the first insulation plate being located adjacent the bottom surface and including a recess adapted to accommodate the first electrode tab so that the first electrode tab is coupled to the cylindrical case;
    a cap assembly located at an opposite end of the cylindrical case from the bottom surface, the cap assembly being coupled to the second electrode tab and sealing the case; and
    further comprising a pin configured to be disposed longitudinally within the space of the electrode assembly, the pin further configured to extend through a through-hole of the first insulation plate and contact the first electrode tab.

13. The cylindrical lithium secondary battery of claim 12, wherein a height of the pin is about 90% to 110% of a height of the electrode assembly.

14. The cylindrical lithium secondary battery of claim 12, wherein when the pin is disposed in the through-hole and in contact with the first electrode tab, the pin fails to contact the second electrode tab.

* * * * *

UNITED STATES PATENT AND TRADEMARK OFFICE
CERTIFICATE OF CORRECTION

| | | |
|---|---|---|
| PATENT NO. | : 7,754,376 B2 | Page 1 of 2 |
| APPLICATION NO. | : 11/478444 | |
| DATED | : July 13, 2010 | |
| INVENTOR(S) | : Kwansic Chun | |

It is certified that error appears in the above-identified patent and that said Letters Patent is hereby corrected as shown below:

On the Title Page

Item (57) Abstract, line 3            Delete "tap"
                                      Insert -- tab --

Item (57) Abstract, line 4            Delete "tap"
                                      Insert -- tab --

Item (57) Abstract, line 13           Delete "tap, the first electrode tap being coupled to the bottom surface"

Insert -- tab, the first electrode tab being coupled to the bottom surface. --

Item (57) Abstract, line 16           Delete "tap"
                                      Insert -- tab --

In the Drawings

FIG. 3, Sheet 5 of 9                  Delete Drawing Sheet 5 of 9 and substitute therefore the Drawing Sheet, consisting of FIG. 3, as shown on the attached page.

Signed and Sealed this
Twenty-ninth Day of May, 2012

David J. Kappos
*Director of the United States Patent and Trademark Office*